United States Patent
Smith

(10) Patent No.: US 10,378,260 B2
(45) Date of Patent: *Aug. 13, 2019

(54) FLUID CIRCUIT FOR BALE EJECTION

(71) Applicant: CNH Industrial America LLC, New Holland, PA (US)

(72) Inventor: Kevin M Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 930 days.

This patent is subject to a terminal disclaimer.

(21) Appl. No.: 14/799,186

(22) Filed: Jul. 14, 2015

(65) Prior Publication Data

US 2015/0315836 A1    Nov. 5, 2015

Related U.S. Application Data

(62) Division of application No. 14/089,556, filed on Nov. 25, 2013, now Pat. No. 9,107,348.

(51) Int. Cl.
| | | |
|---|---|---|
| *A01F 15/08* | (2006.01) | |
| *E05F 1/00* | (2006.01) | |
| *E05F 3/00* | (2006.01) | |
| *E05F 15/50* | (2015.01) | |
| *A01F 15/07* | (2006.01) | |

(52) U.S. Cl.
CPC .......... *E05F 15/50* (2015.01); *A01F 15/07* (2013.01); *A01F 15/085* (2013.01); *A01F 15/0883* (2013.01); *E05F 1/002* (2013.01); *E05F 3/00* (2013.01)

(58) Field of Classification Search
CPC .... A01F 15/0883; A01F 15/085; A01F 15/07; A01F 2015/078; A01F 2015/0795; E05F 15/50; E05F 1/002; E05F 3/04

USPC .......................................................... 100/88
See application file for complete search history.

(56) References Cited

U.S. PATENT DOCUMENTS

| | | |
|---|---|---|
| 4,072,096 A | 2/1978 | Philips |
| 4,483,247 A | 11/1984 | Coeffic |
| 4,683,815 A | 4/1987 | Van Ryswyk |
| 5,263,410 A | 11/1993 | Olin |
| 5,622,104 A | 4/1997 | Viesselmann et al. |
| 6,272,825 B1 | 8/2001 | Anderson et al. |
| 6,295,797 B1 | 10/2001 | Naaktgeboren et al. |
| 6,644,006 B1 | 11/2003 | Merritt et al. |
| 6,688,092 B2 | 2/2004 | Anstey et al. |

(Continued)

FOREIGN PATENT DOCUMENTS

| | | | |
|---|---|---|---|
| EP | 0479190 | 9/1991 | |
| EP | 2183957 A1 * | 5/2010 | ............. A01F 15/07 |
| GB | 1582675 A | 1/1981 | |

*Primary Examiner* — Jimmy T Nguyen
(74) *Attorney, Agent, or Firm* — Patrick M. Sheldrake; Peter K. Zacharias

(57) ABSTRACT

A hydraulic circuit mechanically linked to a panel and agricultural harvesters including the same. The hydraulic circuit can be used to facilitate the transition of hydraulic states from a quick speed to a slow speed, when opening and closing the panel. The hydraulic circuit includes a restrictive orifice and a fluid stop valve that, when opened, diverts the path of pressurized fluid away from a hydraulic actuator during the actuator's extension. The diversion of pressurized fluid away from the hydraulic cylinder or through the restrictive orifice substantially reduces the speed at which the panel opens or closes.

9 Claims, 9 Drawing Sheets

(56) References Cited

U.S. PATENT DOCUMENTS

| | | |
|---|---|---|
| 6,877,304 B1 | 4/2005 | Smith et al. |
| 6,892,632 B1 | 5/2005 | Viesselmann et al. |
| 7,472,649 B1 | 1/2009 | Derscheid et al. |
| 7,805,914 B2 | 10/2010 | Smith |
| 7,849,791 B2 | 12/2010 | Smith |
| 8,887,732 B2 | 11/2014 | Choi et al. |
| 8,991,308 B2 | 3/2015 | Roberge et al. |
| 9,107,348 B2 * | 8/2015 | Smith ................. A01F 15/0883 |
| 9,113,599 B2 | 8/2015 | Smith et al. |
| 2005/0247215 A1 | 11/2005 | Biziorek et al. |
| 2005/0257513 A1 | 11/2005 | Smith et al. |
| 2015/0143789 A1 | 5/2015 | Smith |

* cited by examiner

FLUID CIRCUIT FOR BALE EJECTION

This divisional application claims priority under 35 U.S.C. § 120 from co-pending U.S. patent application Ser. No. 14/089,556 filed on Nov. 25, 2013 by Kevin M. Smith with the same title, the full disclosure of which is hereby incorporated by reference.

TECHNOLOGY FIELD

The present invention relates generally to package crop balers, and, more particularly, to an improved system and method of raising and closing a tailgate of a baling mechanism.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a round baler is pulled along the windrows to pick up the crop material and form it into cylindrically shaped round bales. More specifically, the pickup of the baler gathers the cut and windrowed crop material from the ground and then conveys the cut crop material with a conveyor, such as a rotating conveying rotor, into a bale-forming chamber within the baler. The pickup assembly has a drive mechanism that operates to activate both the pickup and the conveying rotor, and the pickup drive mechanism is operably connected to and driven by the main drive mechanism of the baler. The baling chamber consists of a pair of opposing sidewalls with a series of belts that rotate and compress the crop material into a cylindrical shape. When the bale has achieved a desired size and density, the round baler wraps the bale with twine or other wrapping material, such as film or net, to ensure that the bale maintains its shape and density. Then the operator raises the tailgate of the baler and ejects the bale onto the ground. The tailgate is then closed and the cycle repeated as necessary and desired to manage the field of cut crop material.

The rotor conveyor mechanism ("rotor" or "rotor mechanism") between the pickup and the bale-forming chamber is usually referred to as the "stuffer", because it stuffs the crop material into the gap between the floor roll and the starter roll into the bale-forming chamber.

Opening and closing of the tailgate has been controlled by a flow valve, which was located between a source of pressurized hydraulic fluid and an actuator. The position of the flow valve was controlled by a hydraulic lever. To increase efficiency, the rate of opening and closing of the tailgate should be rapid. However, such rapid movement of the tailgate can lead to damage to the baler. Therefore, to slow the rate of opening and closing near the end of the opening or closing portion of the cycle, the hydraulic valve has been "feathered" by positioning the hydraulic lever between its fully open position and its fully closed position. This solution depends on the skill of the operator and requires the attention of the operator.

Exemplary prior art tailgate opening and closing mechanisms, which do not vary the speed of opening or closing, are shown in Viesselmann et al. U.S. Pat. No. 5,622,104 and Anderson U.S. Pat. No. 6,272,825. Biziorek et al. U.S. Patent Application Publication No. 2005/0247215 discloses a round baler that varies the speed of the opening and closing of the tailgate using tailgate position sensors.

In order to prevent rapid decelerations of the tailgate when it meets its closing stops, the Viesselmann system includes an orifice that continuously slows the flow of oil to and from the tailgate hydraulic actuators to effectively cushion the closing of the tailgate. The flow restriction valve assembly of Anderson is either open or closed and prevents the tailgate from slamming shut. The result is that the tailgate motion is slowed and the open and close cycle time of the tailgate is increased, making the baling operation less efficient.

To improve efficiency, it is desirable to restrict flow of the fluid to the actuator only near the end of the opening and closing motions. While the flow of hydraulic fluid to the tailgate actuator of Biziorek is regulated by valve device, the control system of Biziorek requires a number of positional sensors to determine the position of the tailgate. The addition of the positional sensors increases the cost of the baler due to increased installation cost, as well as the addition of components that are subject to failure. Additionally, an important functional limitation of Biziorek is the valve in the fluid circuit that forcibly causes the hydraulic system to change speed when either in a closed or open state.

The embodiments provided herein provide for an improved baler by providing faster and smoother tailgate operation and providing less stress on the tailgate that is involved in ejecting the bale with efficient operation and advantages over prior controllers of tailgate operation. Rather than forcibly causing the tailgate to close by opening and shutting of a single valve, some embodiments accomplish a smoother opening and closing function the tailgate by utilization of the combination of one or more check valves and a restrictive orifice which cause back pressure in the circuit. Float of the tailgate is accomplished while the tailgate is in a substantially open positions and while the circuit is in one or more of the hydraulic states described herein.

SUMMARY

Embodiments of the present invention address and overcome one or more of the above shortcomings and drawbacks, by providing agricultural harvesters, including balers and combines that comprise the disclosed hydraulic circuit so that crop material is more efficiently transported and ejected from the bale chamber. This technology is particularly well-suited for, but by no means limited to, round balers, cotton harvesters, and/or combines comprising a baling mechanism.

The invention relates to an agricultural harvester comprising: a baling chamber having a bale outlet and a tailgate at a rear section of the baling chamber, the tailgate movable between a closed and one or more open positions and obstructing the bale outlet in its closed position; at least one actuator mechanically linked to the tailgate, the at least one actuator capable of moving the tailgate between the closed and one or more open positions and having (i) a first fluid opening on one end of the actuator, (ii) a second fluid opening on the opposite end of the actuator, wherein the first and second fluid openings feed and return pressurized fluid into a hydraulic circuit; a source of pressurized fluid in fluid communication with the first and second openings for supplying fluid to and returning fluid from the actuator in the hydraulic circuit; a fluid stop valve in fluid communication with the hydraulic circuit; and a fluid controller that controls the flow of pressurized fluid through the fluid stop valve from the source of pressurized fluid or from the at least one actuator; wherein the tailgate moves from a closed position to one or more open positions in a first and a second hydraulic state; whereby, in the first hydraulic state, the stop valve is closed allowing pressurized fluid from the source of pressurized fluid to enter the first fluid opening directly; and, simultaneously, pressurized fluid returns from the at least one actuator through the second fluid opening directly to the source of the pressurized fluid; whereby, in the second hydraulic state, the fluid stop valve is open allowing pressurized fluid from the source of the pressurized fluid to flow through the open stop valve and to return pressurized fluid directly to the source of the pressurized fluid thereby diverting a volume of pressurized fluid from entering the first fluid opening of the at least one actuator and substantially reducing and/or stopping movement of the actuator.

The invention relates to an agricultural harvester comprising: a baling chamber having a bale outlet and a tailgate at a rear section of the baling chamber, the tailgate movable between a closed and one or more open positions and obstructing the bale outlet in its closed position; at least one actuator mechanically linked to the tailgate, the at least one actuator capable of moving the tailgate between the closed and one or more open positions and having (i) a first fluid opening on one end of the actuator, (ii) a second fluid opening on the opposite end of the actuator, wherein the first and second fluid openings feed and return pressurized fluid into a hydraulic circuit; a source of pressurized fluid in fluid communication with the first and second openings for supplying fluid to and returning fluid from the actuator in the hydraulic circuit; a fluid stop valve in fluid communication with the hydraulic circuit; and a fluid controller that controls the flow of pressurized fluid through the fluid stop valve from the source of pressurized fluid or from the at least one actuator; wherein the tailgate moves from a closed position to one or more open positions in a first and a second hydraulic state; whereby, in the first hydraulic state, the stop valve is closed allowing pressurized fluid from the source of pressurized fluid to enter the first fluid opening; and, simultaneously, pressurized fluid returns from the at least one actuator through the second fluid opening to the source of the pressurized fluid; whereby, in the second hydraulic state, the fluid stop valve is open allowing pressurized fluid from the source of the pressurized fluid to flow through the open stop valve and to return pressurized fluid to the source of the pressurized fluid thereby diverting a volume of pressurized fluid from entering the first fluid opening of the at least one actuator and substantially reducing and/or stopping movement of the actuator. In some embodiments, the invention relates to an agricultural harvester comprising:

a baling chamber having a bale outlet and a tailgate at a rear section of the baling chamber, the tailgate movable between a closed and one or more open positions and obstructing the bale outlet in its closed position;

at least one actuator mechanically linked to the tailgate, the at least one actuator capable of moving the tailgate between the closed and one or more open positions and having a first fluid opening on one end of the actuator, a second fluid opening on the opposite end of the actuator, wherein the first and second fluid openings feed and return pressurized fluid into a hydraulic circuit;

a source of pressurized fluid in fluid communication with the first and second openings for supplying fluid to and returning fluid from the actuator in the hydraulic circuit;

a fluid stop valve in fluid communication with the hydraulic circuit; and a fluid controller that controls the flow of pressurized fluid through the fluid stop valve from the source of pressurized fluid or from the at least one actuator;

wherein the tailgate moves from a closed position to one or more open positions in a first and a second hydraulic state; whereby, in the first hydraulic state, the stop valve is closed allowing pressurized fluid from the source of pressurized fluid to enter the first fluid opening directly; and, simultaneously, pressurized fluid returns from the at least one actuator through the second fluid opening directly to the source of the pressurized fluid; whereby, in the second hydraulic state, the fluid stop valve is open allowing pressurized fluid from the source of the pressurized fluid to flow through the open stop valve and to return pressurized fluid directly to the source of the pressurized fluid thereby diverting a volume of pressurized fluid from entering the first fluid opening of the at least one actuator and substantially reducing and/or stopping movement of the actuator, wherein the actuator further comprises a first switch and a second switch, the first switch and second switch each having a first state and a second state and being in operable connection to the fluid controller, wherein the tailgate moves from the first to the second hydraulic state upon activation of the first switch from its first to second state.

In some embodiments, the invention relates to an agricultural harvester disclosed herein further comprising a controller that measures a time period for the first switch change from a first state to a second state and a time period for the second tailgate switch to change from a first state to a second state, wherein the time period for the first tailgate switch to change from a first state to a second state is dependent upon at least one or a combination of: (i) a diameter or density of a bale growing in the bale chamber; (ii) a presence or absence of a bale in the bale chamber; (iii) a predetermined position of the tailgate relative to its closed position; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber. In some embodiments, the invention relates to any of the agricultural harvester disclosed herein, wherein the fluid controller is programmed to allow flow of the pressurized fluid through the fluid stop valve and wherein the time period for the first tailgate switch to change from a first state to a second state is dependent upon at least a predetermined position of the tailgate.

The invention also relates to any agricultural harvester disclosed herein comprising a fluid controller, wherein the fluid controller is a solenoid programmed to be energized and open the fluid stop valve thereby diverting free flow of the pressurized fluid to the at least one actuator based upon at least the predetermined position of at least one serpentine arm. In some embodiments, the fluid controller is a solenoid programmed to be energized and open the fluid stop valve thereby diverting the free flow of pressurized fluid to the at least one actuator based upon at least the predetermined position of the bale ramp. In some embodiments, the fluid controller is a solenoid programmed to be energized and open the fluid stop valve thereby diverting the free flow of pressurized fluid to the at least one actuator based upon at least a predetermined position of the tailgate.

The invention also relates to the agricultural harvester of claim comprising: a baling chamber having a bale outlet and a tailgate at a rear section of the baling chamber, the tailgate movable between a closed and one or more open positions and obstructing the bale outlet in its closed position; at least one actuator mechanically linked to the tailgate, the at least one actuator capable of moving the tailgate between the closed and one or more open positions and having a first fluid opening on one end of the actuator, a second fluid opening on the opposite end of the actuator, wherein the first and second fluid openings feed and return pressurized fluid into a hydraulic circuit; a source of pressurized fluid in fluid communication with the first and second openings for supplying fluid to and returning fluid from the actuator in the hydraulic circuit; a fluid stop valve in fluid communication with the hydraulic circuit; and a fluid controller that controls the flow of pressurized fluid through the fluid stop valve from the source of pressurized fluid or from the at least one actuator; wherein the tailgate moves from a closed position to one or more open positions in a first and a second hydraulic state; whereby, in the first hydraulic state, the stop valve is closed allowing pressurized fluid from the source of pressurized fluid to enter the first fluid opening directly; and, simultaneously, pressurized fluid returns from the at least one actuator through the second fluid opening directly to the source of the pressurized fluid; whereby, in the second hydraulic state, the fluid stop valve is open allowing pressurized fluid from the source of the pressurized fluid to flow through the open stop valve and to return pressurized fluid directly to the source of the pressurized fluid thereby diverting a volume of pressurized fluid from entering the first fluid opening of the at least one actuator and substantially reducing and/or stopping movement of the actuator, wherein the tailgate moves from an opened position to a closed position in a third and a fourth hydraulic state; whereby, in the third hydraulic state, the flow of the pressurized fluid is reversed in the hydraulic circuit such that fluid from the source of pressurized fluid flows to the second fluid opening of the at least one actuator, and, simultaneously, pressurized fluid returns from the at least one actuator through the first fluid opening and through the open stop valve allowing free flow of pressurized fluid from the at least one actuator to the source of the pressurized fluid; and whereby, in the fourth hydraulic state, the fluid stop valve is closed diverting the flow of pressurized fluid from the at least one actuator through the first fluid opening and through a restrictive orifice and subsequently into the source of pressurized fluid, wherein the restrictive orifice allows minimal flow of volume in the hydraulic circuit thereby substantially slowing and/or stopping the movement of the tailgate as it approached its closed position. The invention also relates to any of the agricultural harvesters disclosed herein, wherein the tailgate moves from an opened position to a closed position in a third and a fourth hydraulic state; whereby, in the third hydraulic state, the flow of the pressurized fluid is reversed in the hydraulic circuit such that fluid from the source of pressurized fluid flows directly to the second fluid opening of the at least one actuator, and, simultaneously, pressurized fluid returns from the at least one actuator through the first fluid opening and through the open stop valve allowing free flow of pressurized fluid from the at least one actuator to the source of the pressurized fluid; and whereby, in the fourth hydraulic state, the fluid stop valve is closed diverting the flow of pressurized fluid from the at least one actuator through the first fluid opening and through a restrictive orifice and subsequently into the source of pressurized fluid, wherein the restrictive orifice allows minimal flow of volume in the hydraulic circuit thereby substantially slowing and/or stopping the movement of the tailgate as it approached its closed position. in some embodiments, the agricultural harvester further comprises at least one relief valve that exerts pressure on at least one actuator of the baler when the tailgate is closing. In some embodiments, the tailgate moves from the third to the fourth hydraulic state upon either: (i) activation of the second switch from its first to second state or (ii) movement and/or position of one or more serpentine arms in one or more baling mechanisms. In some embodiments, the invention further relates to any of the agricultural harvesters disclosed herein, further comprising at least one activation device in operable connection to the fluid controller and manually activatable to commence movement of the tailgate from the one or more open positions and/or from the closed position. In some embodiments, the fluid controller is a solenoid. In some embodiments, the flow controller is a mechanical controller. If the fluid controller is a solenoid, in some embodiments the solenoid is programmed to be energized based upon the activation of the second switch from its first to second state. If the fluid controller is a solenoid, in some embodiments the solenoid is programmed to be energized based upon the height or position of one or more serpentine arms in the baling mechanism.

In some embodiments, the agricultural harvester or system of the present invention further comprises a controller that measures a time period for the second switch change from a first state to a second state and a time period for the second tailgate switch to change from a first state to a second state, wherein the time period for the second tailgate switch to change from a first state to a second state is dependent upon at least one or a combination of: (i) a diameter or density of a bale growing in the bale chamber; (ii) a presence or absence of a bale in the bale chamber; (iii) a predetermined position of the tailgate relative to its open position; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber. In some embodiments, the agricultural harvester is chosen from a round baler cotton harvester, or combine comprising a baling mechanism.

The invention further relates to a system for operation of a tailgate mechanism on an agricultural harvester comprising a baling chamber having a bale outlet and a tailgate at a rear section of the baling chamber, the tailgate movable between a closed and one or more open positions and obstructing the bale outlet in its closed position; at least one actuator mechanically linked to the tailgate, the at least one actuator capable of moving the tailgate between the closed and one or more open positions and having a first fluid opening on one end of the actuator, a second fluid opening on the opposite end of the actuator, wherein the first and second fluid openings feed and return pressurized fluid into a hydraulic circuit; the hydraulic circuit comprising a source of pressurized fluid in fluid communication with the first and second openings for supplying fluid to and returning fluid from the at least one actuator in the hydraulic circuit; a fluid stop valve in fluid communication with the source of pressurized fluid and the at least one actuator; and a fluid controller that controls the flow of pressurized fluid through the fluid stop valve from the source of pressurized fluid or from the at least one actuator; a first hydraulic path in which pressurized fluid from the source of the pressurized fluid freely flows to the first fluid opening of the at least one actuator without contacting the fluid stop valve, and, simultaneously, pressurized fluid from the at least one actuator returns directly to the source of the pressurized fluid through the second fluid opening; and a second hydraulic path, whereupon the fluid stop valve is open, pressurized fluid from the source of the pressurized fluid flows through the open stop valve and returns directly to the source of the pressurized fluid thereby diverting a volume of pressurized fluid from entering the first fluid opening of the at least one actuator and substantially reducing and/or stopping movement of the actuator. In some embodiments, the system further comprises a third hydraulic path in which pressurized fluid from the source of pressurized fluid flows directly to the second fluid opening of the at least one actuator, and, simultaneously, pressurized fluid returns from the at least one actuator through the first fluid opening and through the open stop valve allowing free flow of pressurized fluid from the at least one actuator to the source of the pressurized fluid; and a fourth hydraulic path, whereupon the fluid stop valve is closed, pressurized fluid flows from the at least one actuator through the first fluid opening and through a restrictive orifice and subsequently into the source of pressurized fluid, wherein the restrictive orifice allows minimal flow of volume in the hydraulic circuit thereby substantially slowing and/or stopping the movement of the tailgate as it moves from an open position to its closed position.

The invention also relates to a hydraulic circuit comprising: at least one actuator mechanically linked to a panel, the at least one actuator capable of moving the panel between a closed and one or more open positions and comprising a first fluid opening on one end of the actuator, a second fluid opening on the opposite end of the actuator, wherein the first and second fluid openings feed and return pressurized fluid into the hydraulic circuit; a source of pressurized fluid in fluid communication with the first and second fluid openings for supplying fluid to the at least one actuator in the hydraulic circuit; a fluid stop valve in fluid communication with the source of pressurized fluid and the at least one actuator; a fluid controller that controls the flow of pressurized fluid through the fluid stop valve from the source of pressurized fluid or from the at least one actuator; a first hydraulic path, operable when the fluid stop valve is in a closed position, in which pressurized fluid from the source of the pressurized fluid freely flows to the first fluid opening of the at least one actuator without passing through the fluid stop valve, and, simultaneously, pressurized fluid from the at least one actuator returns directly to the source of the pressurized fluid through the second fluid opening without passing through the fluid stop valve; a second hydraulic path, operable when the fluid stop valve is in an open position, in which pressurized fluid from the source of the pressurized fluid flows through the open stop valve and returns directly to the source of the pressurized fluid thereby diverting a volume of pressurized fluid from entering the first fluid opening of the at least one actuator and substantially reducing and/or stopping movement of the actuator; a third hydraulic path, operable when the fluid stop valve is in an open position, in which pressurized fluid from the source of pressurized fluid flows directly to the second fluid opening of the at least one actuator, and, simultaneously, pressurized fluid returns from the at least one actuator through the first fluid opening and through the open stop valve allowing free flow of pressurized fluid from the at least one actuator to the source of the pressurized fluid; and a fourth hydraulic path, operable when the stop valve is in a closed position, in which pressurized fluid flows from the at least one actuator through the first fluid opening and through a restrictive orifice and subsequently into the source of pressurized fluid, wherein the restrictive orifice allows minimal flow of volume in the hydraulic circuit thereby substantially slowing and/or stopping the movement of the panel, or, in some embodiments, a tailgate as it moves from an open position to its closed position; and at least one fluid source controller that controls the direction of pressurized fluid flow in the hydraulic circuit such that pressurized fluid may flow from the source of the pressurized fluid toward the first opening when opening the panel in the first or second hydraulic paths or from the source of the pressurized fluid toward the second fluid opening when closing the panel in the third or fourth hydraulic paths. In some embodiments, the hydraulic circuit comprises an actuator further comprising a first switch and a second switch, the first switch and second switch each having a first state and a second state and being in operable connection to the fluid controller, wherein the panel moves from a first hydraulic state to a second hydraulic state upon activation of the first switch from its first to second state. In some embodiments, the hydraulic circuit further comprises a controller that measures a time period for the first switch change from a first state to a second state and a time period for the second switch to change from a first state to a second state, wherein the time period for the first tailgate switch to change from a first state to a second state is dependent upon at least one or a combination of: (i) a diameter or density of a bale growing in the bale chamber; (ii) a presence or absence of a bale in the bale chamber; (iii) a predetermined position of the tailgate relative to its closed position; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber. In some embodiments, one or more controllers that measures a time period for the first switch change from a first state to a second state and a time period for the second switch to change from a first state to a second state is a potentiometer.

In some embodiments, the invention relates to a system for operation of a tailgate mechanism on an agricultural harvester comprising, a baling chamber having a bale outlet and a tailgate at a rear section of the baling chamber, the tailgate movable between a closed and one or more open positions and obstructing the bale outlet in its closed position; at least one actuator mechanically linked to the tailgate, the at least one actuator capable of moving the tailgate between the closed and one or more open positions and having a first fluid opening on one end of the actuator, a second fluid opening on the opposite end of the actuator, wherein the first and second fluid openings feed and return pressurized fluid into a hydraulic circuit; the hydraulic circuit comprising a source of pressurized fluid in fluid communication with the first and second openings for supplying fluid to and returning fluid from the at least one actuator in the hydraulic circuit; a fluid stop valve in fluid communication with the source of pressurized fluid and the at least one actuator; and a fluid controller that controls the flow of pressurized fluid through the fluid stop valve from the source of pressurized fluid or from the at least one actuator; a first hydraulic path in which pressurized fluid from the source of the pressurized fluid flows to the first fluid opening of the at least one actuator without contacting the fluid stop valve, and, simultaneously, pressurized fluid from the at least one actuator returns to the source of the pressurized fluid through the second fluid opening; and a second hydraulic path comprising a first hydraulic state whereupon the fluid stop valve is open, pressurized fluid from the source of the pressurized fluid flows through the open stop valve and returns to the source of the pressurized fluid thereby diverting a volume of pressurized fluid from entering the first fluid opening of the at least one actuator.

The invention relates to an agricultural harvester comprising:
- a panel outlet and a panel, the panel movable between a closed and one or more open positions and obstructing the panel outlet in its closed position;
- at least one actuator mechanically linked to the panel, the at least one actuator capable of moving the panel between the closed and one or more open positions and having a first fluid opening on one end of the actuator, a second fluid opening on the opposite end of the actuator, wherein the first and second fluid openings feed and return pressurized fluid into a hydraulic circuit;
- a source of pressurized fluid in fluid communication with the first and second openings for supplying fluid to and returning fluid from the actuator in the hydraulic circuit;
- a fluid stop valve in fluid communication with the hydraulic circuit; and
- a fluid controller that controls the flow of pressurized fluid through the fluid stop valve from the source of pressurized fluid or from the at least one actuator; wherein the panel moves from a closed position to one or more open positions in a first and a second hydraulic state; whereby, in the first hydraulic state, the stop valve is closed allowing pressurized fluid from the source of pressurized fluid to enter the first fluid opening directly; and, simultaneously, pressurized fluid returns from the at least one actuator through the second fluid opening directly to the source of the pressurized fluid; whereby, in the second hydraulic state, the fluid stop valve is open allowing pressurized fluid from the source of the pressurized fluid to flow through the open stop valve and to return pressurized fluid directly to the source of the pressurized fluid thereby diverting a volume of pressurized fluid from entering the first fluid opening of the at least one actuator and
- substantially reducing and/or stopping movement of the actuator.

The invention further relates to an agricultural harvester comprising:
- a panel outlet and a panel, the panel movable between a closed and one or more open positions and obstructing the panel outlet in its closed position;
- at least one actuator mechanically linked to the panel, the at least one actuator capable of moving the panel between the closed and one or more open positions and having a first fluid opening on one end of the actuator, a second fluid opening on the opposite end of the actuator, wherein the first and second fluid openings feed and return pressurized fluid into a hydraulic circuit;
- a source of pressurized fluid in fluid communication with the first and second openings for supplying fluid to and returning fluid from the actuator in the hydraulic circuit;
- a fluid stop valve in fluid communication with the hydraulic circuit; and
- a fluid controller that controls the flow of pressurized fluid through the fluid stop valve from the source of pressurized fluid or from the at least one actuator; wherein the panel moves from one or more open positions to a closed position in a first and a second hydraulic state; whereby pressurized fluid in the first hydraulic state, operable when the fluid stop valve is in an open position, flows in a first hydraulic path in which pressurized fluid from the source of pressurized fluid flows to the second fluid opening of the at least one actuator, and, simultaneously, pressurized fluid returns from the at least one actuator through the first fluid opening and through the open stop valve allowing free flow of pressurized fluid from the at least one actuator to the source of the pressurized fluid; and
- whereby pressurized fluid in the second hydraulic state, operable when the fluid stop valve is in a closed position, flows in a second hydraulic path in which pressurized fluid from the source of pressurized fluid flows to the second fluid opening of the at least one actuator, and, simultaneously, from the at least one actuator through the first fluid opening and through a restrictive orifice and subsequently into the source of pressurized fluid, wherein the restrictive orifice allows minimal flow of volume in the hydraulic circuit thereby substantially slowing and/or stopping the movement of the panel as it moves from an open position to its closed position and wherein a volume of pressurized fluid bypasses the fluid stop valve.

The invention also relates to a method of extending or contracting an actuator mechanically linked to a panel, the method comprising using the hydraulic system disclosed herein, wherein, using the hydraulic system comprises: directing the flow of pressurized fluid into the first hydraulic path and then subsequently into the second hydraulic path if to extend the actuator; and/or directing the flow of pressurized fluid into the third hydraulic path and then subsequently into the fourth hydraulic path if to contract the actuator.

The invention further relates to an agricultural harvester comprising: a baling chamber having a bale outlet and a tailgate at a rear section of the baling chamber, the tailgate movable between a closed and one or more open positions and obstructing the bale outlet in its closed position; at least one actuator mechanically linked to the tailgate, the at least one actuator capable of moving the tailgate between the closed and one or more open positions and having at least a first fluid opening on one end of the at least one actuator, wherein the at least first fluid opening feeds pressurized fluid into a hydraulic circuit; the hydraulic circuit comprising: a source of pressurized fluid in fluid communication with the first openings for supplying fluid to and returning fluid from the actuator in the hydraulic circuit; a fluid stop valve in fluid communication with the hydraulic circuit; and a fluid controller that controls the flow of pressurized fluid through the fluid stop valve from the source of pressurized fluid or from the at least one actuator; wherein the tailgate moves from a closed position to one or more open positions in a first and a second hydraulic state; whereby, in the first hydraulic state, the stop valve is closed allowing pressurized fluid from the source of pressurized fluid to enter the first fluid opening and to bypass the fluid stop valve; whereby, in the second hydraulic state, the fluid stop valve is open allowing pressurized fluid from the source of the pressurized fluid to flow through the open fluid stop valve and to return pressurized fluid to the source of the pressurized fluid thereby diverting a volume of pressurized fluid from entering the at least one first fluid opening of the at least one actuator and substantially reducing and/or stopping movement of the actuator.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, it being understood, however, that the invention is not limited to the specific instrumentalities disclosed. Included in the drawings are the following

DETAILED DESCRIPTION OF ILLUSTRATIVE EMBODIMENTS

Figure 1:
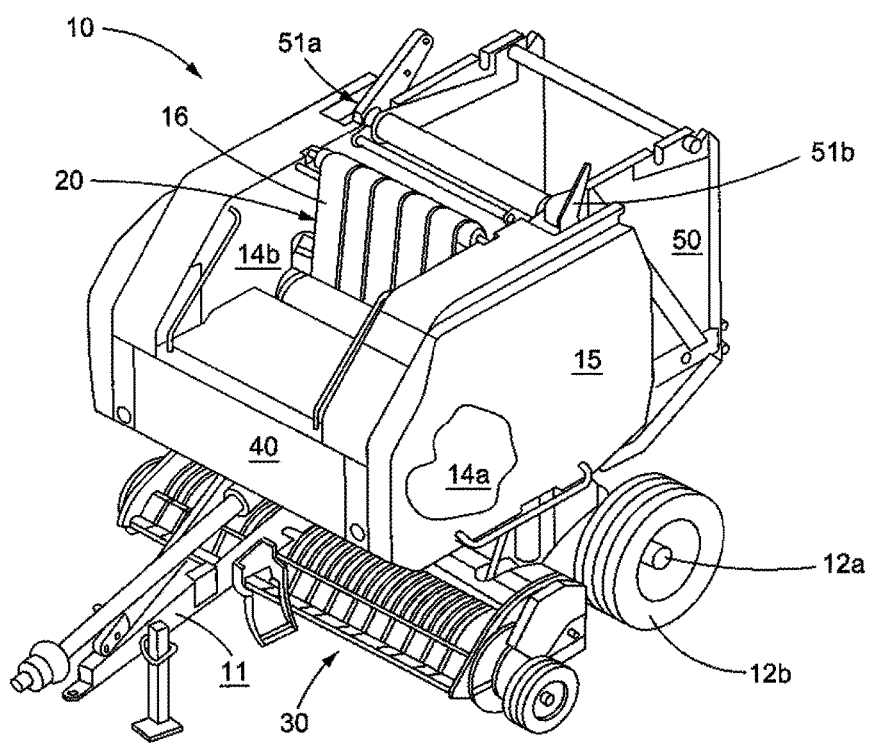
FIG. 1 is a side perspective view of a round baler of the type in which the bale ejection system of the present invention may be integrated.

Many of the fastening, connection, processes and other means and components utilized in the embodiments described herein are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

As used herein the term "panel" means any movable surface or movable component that obstructs an inlet or outlet of a device. In some embodiments, the movable surface is operably linked to a hinge or other means to facilitate an opening motion of the movable surface in response to a signal sent by an operator of the device, such pivoting motion causing exposing the inlet or outlet for use. In some embodiments, the device is a baling mechanism or agricultural harvester comprising a baling mechanism. In some embodiments, the device is a component of agricultural equipment and the movable surface is chosen from a door, panel, gate, or tailgate. In some embodiments, the term panel is used to describe a tailgate of a baling mechanism, said tailgate mechanism in operable communication with an actuator or tensioning actuator.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entireties. Embodiments of the present invention are particularly well suited, but in no way limited to, use with agricultural balers. The present invention may also find utility in agricultural harvesters including, for example, a waste baler, a cotton harvester fitted with a baling mechanism, or a combine fitted with a baling mechanism.

The invention relates generally to a baling system comprising a hydraulic circuit that comprises a tensioning actuator in fluid connection to at least two fluid paths and a source of pressurized fluid 100. Pressurized fluid, such as oil, controls the extension and contraction of a rod 112 and disc 115 in the actuator. In some embodiments, an actuator comprises a first fluid opening 175 and second fluid opening 185. In some embodiments, the first fluid opening 175 is on the disc 115 end of the hydraulic actuator and the second fluid opening 185 is on the opposite, or rod-end of the hydraulic cylinder 110 end, of the actuator. Pressurized fluid enters the tensioning actuator at the first fluid opening 175 or second fluid opening 185 thereby pushing the disc 115 and rod 112 up or down depending upon the direction of flow of the pressurized fluid. The movement of the rod 112 and disc 115 also displaces the volume of pressurized fluid contained within the actuator on the side of the actuator opposite to the side though which the pressurized fluid enters. If the first fluid opening 175 serves as the pressurized fluid inlet or feed, the second fluid opening 185 serves as the pressurized fluid outlet, or return. If an operator switches the direction of flow of the pressurized fluid, the second fluid opening 185 becomes the feed and the first fluid opening 175 becomes the return.

Pressurized fluid is supplied to the actuator by the source of the pressurized fluid, which, in some embodiments, may be an oil depot on a tractor or on an agricultural harvester or agricultural vehicle that pulls a baling mechanism. The operator of the tractor or other vehicle pulling the agricultural harvester (or, in some embodiments, the operator of the agricultural harvester itself) can determine when to switch the direction of the pressurized fluid in the hydraulic circuit by either manually activating a controller in operable communication with the source of the pressurized fluid or programming a processor 150 in operable communication with a controller that directs the flow of the pressurized fluid at or during a predetermined time period or a predetermined time interval. In some embodiments, there may be at least one or more sources of pressurized fluid but, in any such embodiment, the at least one or more sources of pressurized fluid is capable of feeding a hydraulic line that carries pressurized fluid to in fluid the first and second fluid opening 185 of the at least one actuator. Hydraulic lines that serve as conduits for the pressurized fluid from the source of the pressurized fluid to the first fluid opening 175 and second fluid opening 185 of the at last one actuator form a hydraulic circuit in which the pressurized fluid is circulating from the source of the pressurized fluid to the at least one actuator or, in some embodiments, from the source of the pressurized fluid to a fluid stop valve operably coupled to at least one fluid controller 160, the at least one fluid controller 160 capable of opening and closing the fluid stop valve when the fluid controller 160 become activated. In some embodiments, the hydraulic lines carry pressurized fluid from the at least one actuator or the fluid stop valve back to the source of the pressurized fluid. In some embodiments, one of more of the hydraulic lines carry pressurized fluid to one or more check valves or restrictive orifices 120.

In some embodiments, the system or agricultural harvester or hydraulic circuit comprises a panel operably connected to one or more hydraulic circuits. In some embodiments, the hydraulic circuit comprises at least four hydraulic states, each hydraulic state comprising a hydraulic path through which the pressurized fluid preferably flows. The operator may manually manipulate a controller to open or close valves in the hydraulic circuit thereby redirecting the flow of the pressurized fluid from one hydraulic path to another hydraulic path. In some embodiments, the operator may manipulate a controller to reverse the direction of flow in the hydraulic circuit. In some embodiments, the operator may program a processor 150 operably connected to the controller to open or close valves in the hydraulic circuit thereby redirecting the pressurized fluid from one hydraulic path to another hydraulic path and/or reverse the flow of the pressurized fluid in the hydraulic circuit.

In some embodiments, the fluid controller 160 is a solenoid or mechanical switch. In some embodiments, the fluid controller 160 is a solenoid operably coupled to a processor 150 and at least a first and second switch, the processor 150 capable of being programmed by the operator of the agricultural harvester prior to or during operation of the agricultural harvester. In some embodiments, wherein the hydraulic circuit further comprises a first switch and a second switch, the first switch and second switch each having a first state and a second state and being in operable connection to the fluid controller 160, wherein the tailgate moves from the first to the second hydraulic state upon activation of the first switch from its first to second state. In some embodiments, any hydraulic circuit disclosed herein or the agricultural harvester comprising the hydraulic circuit disclosed herein further comprises a controller that measures a time period for the first switch change from a first state to a second state and a time period for the second switch to change from a first state to a second state, wherein the time period for the first switch to change from a first state to a second state is dependent upon at least one or a combination of: (i) a diameter or density of a bale growing in the bale chamber; (ii) a presence or absence of a bale in the bale chamber; (iii) a predetermined position of the tailgate relative to its closed position; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber. In some embodiments, the time period for the first switch to change from a first state to a second state is dependent upon at least a diameter or density of a bale growing in the bale chamber. In some embodiments, the time period for the first switch to change from a first state to a second state is dependent upon at least a presence or absence of a bale in the bale chamber. In some embodiments, the time period for the first switch to change from a first state to a second state is dependent upon at least a predetermined position of the tailgate relative to its closed position. In some embodiments, the time period for the first switch to change from a first state to a second state is dependent upon at least a predetermined position of a serpentine arm mechanically linked to the agricultural harvester and capable of upward movement upon initiating ejection of the bale from the bale chamber. In some embodiments, the time period for the first switch to change from a first state to a second state is dependent upon at least a predetermined position of a bale ramp mechanically linked to the agricultural harvester and capable of supporting a bale ejected from the bale chamber.

In some embodiments, the system or agricultural harvester or hydraulic circuit does not comprise one or more sensors that determine the position of the panel upon opening or closing of the tailgate for purposes of transitioning from a first to second hydraulic state. In some embodiments, the system or agricultural harvester or hydraulic circuit does not comprise one or more sensors that determine the position of the tailgate mechanism upon opening or closing of the panel for purposes of transitioning from a second to third hydraulic state. In some embodiments, the system or agricultural harvester or hydraulic circuit does not comprise one or more sensors that determine the position of the tailgate mechanism upon opening or closing of the panel for purposes of transitioning from a third to fourth hydraulic state. In some embodiments, the system or agricultural harvester or hydraulic circuit does not comprise one or more sensors that determine the position of the panel upon opening or closing of the tailgate for purposes of transitioning from a first to second hydraulic state, or from a second to third hydraulic state, or from a third to a fourth hydraulic state, a combination thereof.

Referring to FIG. 1, a generally well-known round baler 10 is shown to include a main frame terminating forwardly in a tongue 11 and rearward slightly beyond a transverse axle 12A to which a pair of wheels 12B (only one shown) is mounted—thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed into bale-forming chamber 20 where it is formed into a cylindrically shaped ball (not shown) by a series of conveyer belts 16. The bale is then wrapped with twine or a wrapping material dispensed from a wrapping mechanism generally behind shield 40. Upon completion of the wrapping process, the tailgate 50 pivots upwardly about pivot points 51a, 51b and the bale is discharged onto the ground. In some embodiments, the panel is a tailgate 50. In some embodiments, the system, hydraulic circuit, or agricultural harvester comprises at least one or two tensioning actuator, each tensioning actuator being operably linked to the tailgate and in fluid communication with the same or similar hydraulic paths. In some embodiments, the tailgate 50 and hydraulic mechanism that controls the upward swing of the tailgate is replaced by the bale carrier disclosed in U.S. patent application Ser. Nos. 13/308,304 and 13/784,133, each of which are incorporated by reference in their entireties. In some embodiments, the system, the agricultural harvester, the baling mechanism disclosed herein comprises two hydraulic tensioning actuators positioned on opposite sides of the sidewalls of an agricultural harvester.

An embodiment of the present invention is generally described in FIGS. 2-5. The hydraulic circuit disclosed can be used in conjunction with the tailgate of a baler whereby the hydraulic cylinder 110 or actuator 110 is mechanically linked to the sidewall of an agricultural harvester and the tailgate of a baler.

Figure 2:
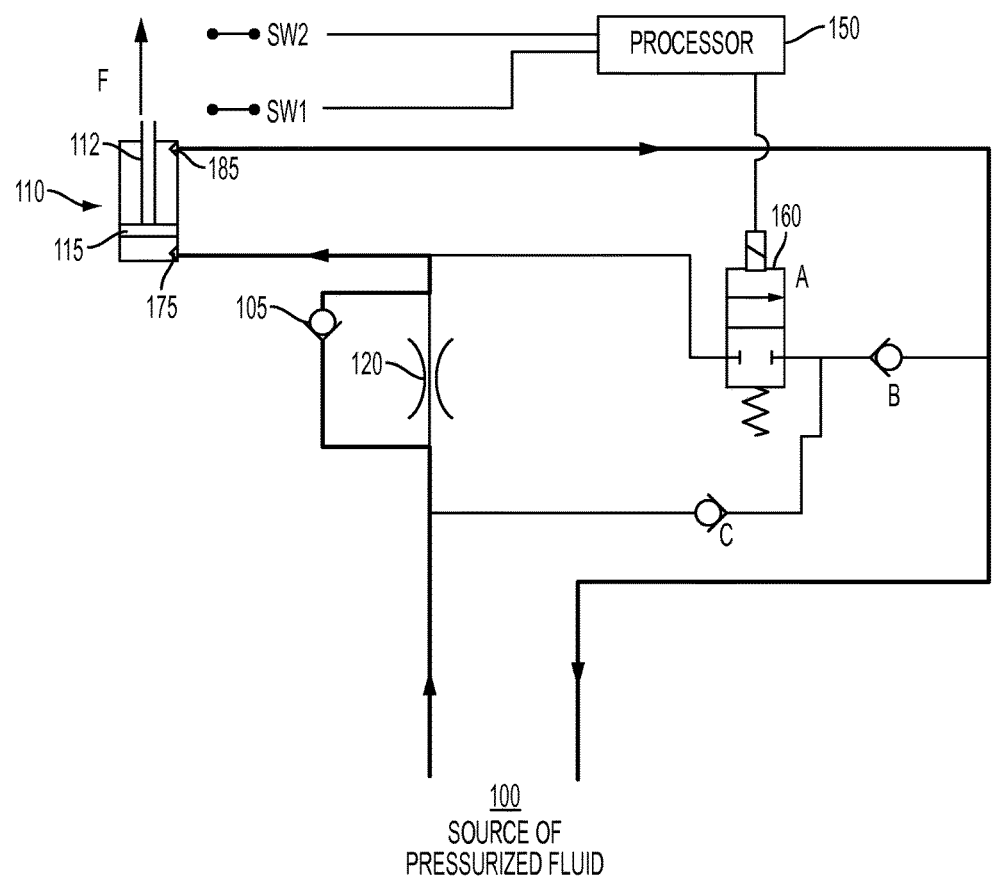
FIG. 2 depicts a first hydraulic flow path of the hydraulic circuit.

FIG. 2 depicts a hydraulic circuit in its first hydraulic state which is engaged by the operator of hydraulic circuit when the operator desires to open the tailgate or panel to which the hydraulic cylinder 110 is mechanically linked. Assuming an operator is operating tractor that is pulling a baler, the operator will actuate a remote on the tractor to initiate the process of raising the tailgate on the baler mechanically linked to the actuator 110 when, for instance, a bale in a bale chamber reaches a desired width or density (not depicted). The hydraulic cylinder 110 comprises a disc 115 and a rod 112 that raise or lower in response to pressurized fluid filling a volume in the cylinder. Pressurized fluid enters the disc-side of the hydraulic cylinder 110 through a first fluid opening 175 or the rod-side of the hydraulic cylinder 110 of the hydraulic cylinder 110 through a second fluid opening 185. The arrow labeled F depicts the movement of the rod 112 and disc 115 in the hydraulic cylinder 110. By steadily allowing the flow of pressurized fluid to one side, the pressurized fluid will build pressure against one side of the disc 115 pushing the disc 115 and rod 112 in one direction and displacing any volume of pressurized fluid in contact with the opposite side of the disc 115. While pressurized fluid (commonly referred to as high pressure fluid) enters through the first fluid opening 175, pressurized fluid in the opposite end of the hydraulic cylinder 110 may exit the hydraulic cylinder 110 through the second fluid opening 185 (commonly referred to as low pressure fluid). In this way, the hydraulic circuit is a closed circuit in which pressurized fluid is circulating to and from the source of the pressurized fluid. The depicted hydraulic circuit comprises a first, second, third, and fourth hydraulic path, each of which dictate when and how quickly the panel, or, in this embodiment,—the tailgate opens and closes. Each hydraulic path comprises a first and second length, wherein the first length of the hydraulic path is the path within which pressurized fluid flows from the source of pressurized fluid 100, and the second length of the hydraulic path is the path within which pressurized fluid returns from either the fluid stop valve A or the hydraulic cylinder 110 to the source of the pressurized fluid 100.

FIG. 2 depicts a first hydraulic state engaged when the operator of the hydraulic circuit desires to raise a panel, such as a tailgate. The flow of pressurized fluid is indicated by the large arrowheads. Pressurized fluid from a tractor enters the first length of the first hydraulic path and flows through a one-way check valve 105. The pressurized fluid flows freely to the first fluid opening 175 of the hydraulic cylinder 110 due to, in part, a restrictive orifice 120 that prevents more than a negligible volume of pressurized fluid from the source of the pressurized fluid 100 to the first fluid opening 175 through the restrictive orifice 120. With the check valve 105 in the circuit, the high pressure oil flows through the path of least resistance, which, in the case of the depicted embodiment, is the check valve instead of the orifice. Consequently, most of the oil flows through the check valve. A small portion of oil will flow through the orifice, but not enough to contribute to or prevent the flow through the primary fluid path of least resistance.

The steady and unobstructed flow of pressurized fluid into the hydraulic cylinder 110 through the first fluid opening 175 builds a volume of pressurized fluid against the disc-side of the hydraulic cylinder 110. Fluid in the rod-side of the hydraulic cylinder 110 becomes displaced by the rod 112 and disc 115 thereby exiting the hydraulic cylinder 110 through the second fluid opening 185. The first hydraulic path also comprises the return of pressurized fluid from the hydraulic cylinder 110 to the tractor in a second length of the first hydraulic path. The steady flow of pressurized fluid into the disc-side of the hydraulic cylinder 110 and out of the rod-side of the hydraulic cylinder 110 causes the extension of the actuator 110 and the quick opening of the tailgate (not depicted). In this first hydraulic state, fluid stop valve A is closed.

A baler controller measures the amount of time (T) it takes for the cylinder to open a first switch SW1 and close a second switch SW2. From this time the controller can determine how fast the tailgate is moving and how far the tailgate has moved. When the baler controller determines that the tailgate has reached a predetermined or preprogrammed distance from its fully closed position or a desired distance (in some embodiments, nearing the end of stroke) or that it is open sufficiently wide to eject the growing bale in the bale chamber, the second switch SW2 closes and the first switch SW1 opens thereby causing the fluid controller 160 to open Valve A. The close of switch SW2 and the opening of fluid stop valve A indicates the transition from the first hydraulic state to the second hydraulic state.

Figure 3:
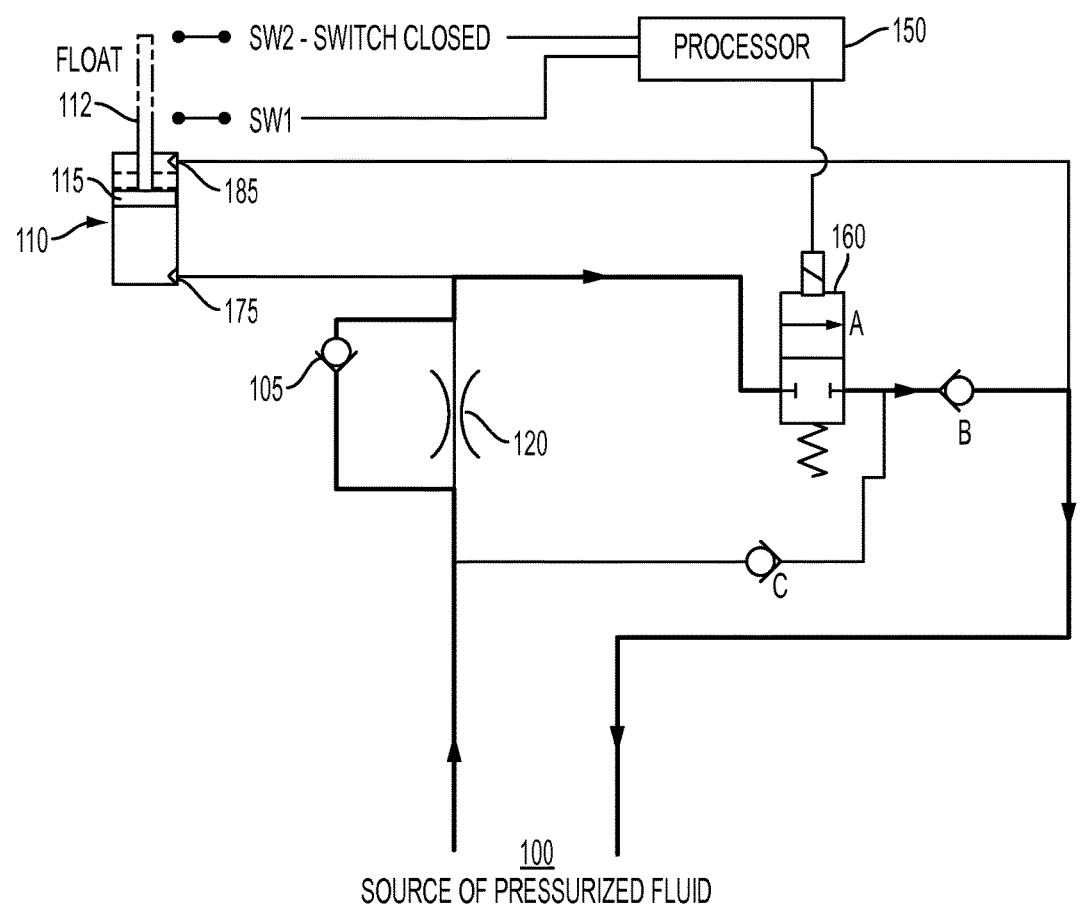
FIG. 3 depicts a second hydraulic flow path of the hydraulic circuit.

FIG. 3 depicts a second hydraulic state of the hydraulic circuit. In the second hydraulic state, the pressurized fluid flows through a second hydraulic path. The fluid stop valve A is open allowing diversion of the flow of the pressurized fluid away from the first fluid opening 175 of the hydraulic cylinder 110 and through open fluid stop valve A. In the second hydraulic path, the diversion of pressurized fluid causes the rod 112 and disc 115 in the hydraulic cylinder 110 to stop moving, the tailgate to substantially reduce the speed at which it opens, float (due to back pressure conveyed by the open fluid stop valve A and/or inertia of the tailgate mass), and eventually stop. The pressurized fluid still flows through a first check valve 105 in a first length of the second hydraulic path so that the pressurized fluid from the source of the pressurized fluid 100 can complete a circuit on the side of the circuit in closest fluid communication with first fluid opening 175 of the hydraulic cylinder 110. In the second hydraulic state, pressurized fluid passing through fluid stop valve A passes into a second length of the second hydraulic path from fluid stop valve A through a second check valve B and then finally back to the source of pressurized fluid 100 or, in this case, the tractor. The tailgate slows to a stop and begins floating to a fully open position (the full open position denoted dotted lines by the disc 115 and the rod 112). "Floating" means that the tailgate remains stationary or substantially stationary, whereby, if the tailgate remains substantially stationary, the tailgate may drift slowly up and/or slowly down depending upon the tailgate weight, tailgate momentum and/or back pressure in the system at the first fluid opening 175. In some embodiments, the tailgate may drift slowly up and/or slowly down depending at least partially upon the position and pitch of the machine on a filed during operation. After bale ejection has been achieved, the operator of the agricultural baler can transition the hydraulic circuit from the second hydraulic state to the third hydraulic state by reversing the flow of pressurized fluid in the hydraulic circuit.

Figure 4:
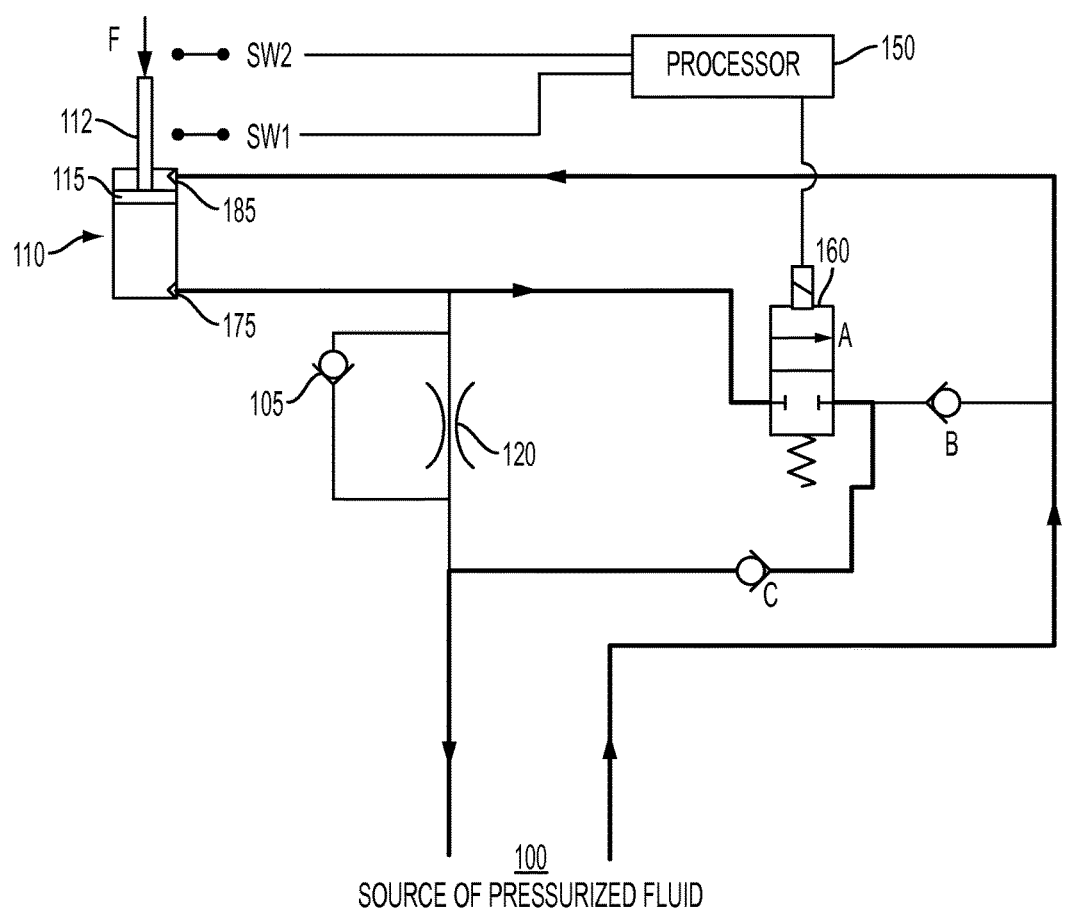
FIG. 4 depicts a third hydraulic flow path of the hydraulic circuit.

The third hydraulic state is depicted in FIG. 4. Similar to the opening phase of the tailgate depicted in FIGS. 2-3, the closing phase of the tailgate is accomplished by at least two hydraulic states each corresponding to its own hydraulic path. Once the flow of pressurized fluid has reversed, a first length of the third hydraulic path involves flow of pressurized fluid from the source of the pressurized fluid freely flows to the second fluid opening 185 of the hydraulic cylinder 110 building a volume of fluid in the rod-end of the hydraulic cylinder 110 and causing the return of fluid from the disc-end of the hydraulic cylinder 110 to the source of pressurized fluid 100. The arrow labeled F depicts the movement of the rod 112 and disc 115 in the hydraulic cylinder 110. This completes a first hydraulic path. A second hydraulic path of the third hydraulic state comprises pressurized fluid from the disc-end of the hydraulic cylinder 110 exiting the first fluid opening 175 of the hydraulic cylinder 110 and returning to the source of the pressurized fluid through fluid stop valve A and through a third check valve C. Free flow of pressurized fluid into the second fluid opening 185 causes a quick closing phase to a predetermined distance calculated by the baler controller, a predetermined time T calculated by the baler controller, or manually engaged the operator who can trigger the first or second switches SW1, SW2. Free flow of pressurized fluid from the hydraulic cylinder to the source of the pressurized fluid is accomplished by open fluid stop valve A so that fluid bypasses the restrictive orifice 120. The tailgate closes at a steady rate. After triggering the baler controller, or, optionally, reversing the states of the switches SW1 SW2 from a first to second or second to first state, the hydraulic circuit transitions from a third hydraulic state to a fourth hydraulic state. In alternative embodiments, the position of one or more serpentine arms in the baling mechanism may trigger the transition from a first to a second hydraulic state and/or from a third hydraulic state to a fourth hydraulic state. Serpentine arms are generally known in the art and are in operable connection with one or more baling belts of a baling mechanism. The serpentine arm or arms are designed to move generally upward or downward to add or remove slack in the one or more baling belt while a bale is changing size within a baling mechanism. Due to the one or more serpentine arms changing position as the bale grows, in some embodiments, transition from a first to a second hydraulic state and/or from the third hydraulic state to the fourth hydraulic state may depend wholly or partially on the position or movement of one or more serpentine arms. One or more triggers for such a transition may occur by the presence of positional or optical sensor at a particular height within a bale chamber or baling mechanism.

Figure 5:
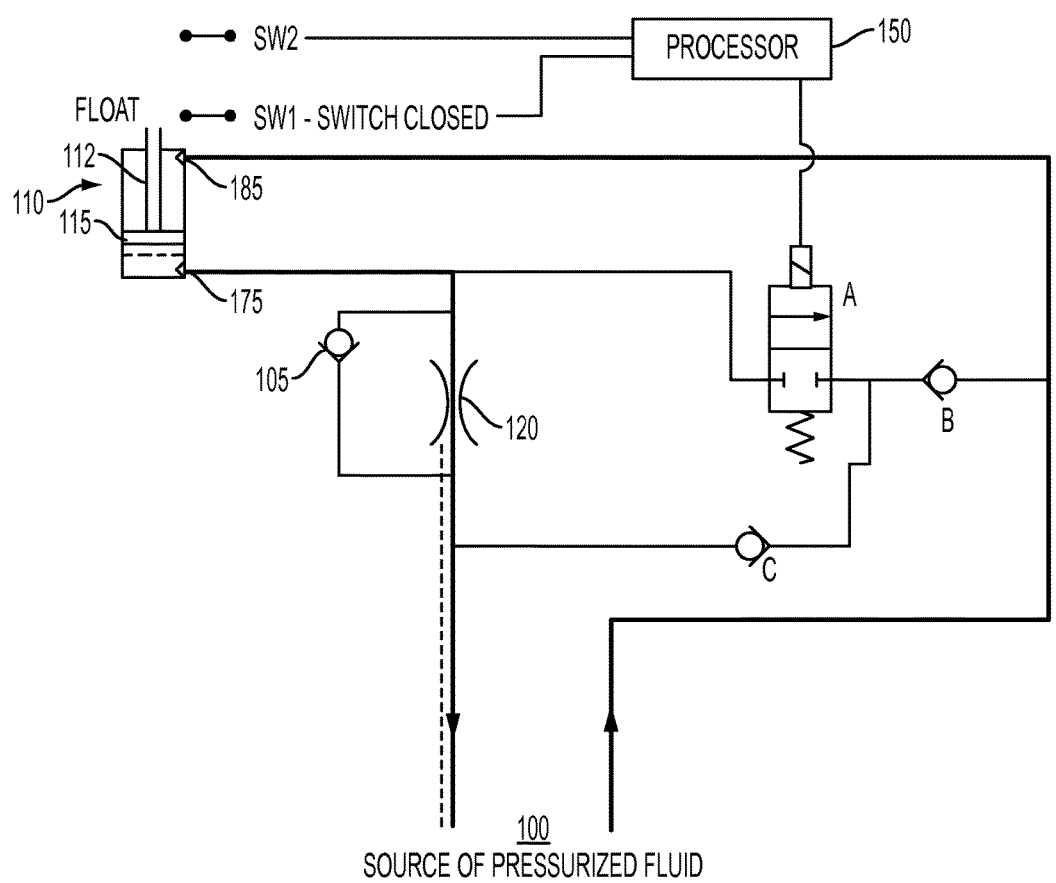
FIG. 5 depicts a fourth hydraulic flow path of the hydraulic circuit.

In a fourth hydraulic state, depicted in FIG. 5, the tailgate is transitioned from a quick closing motion to a slow closing motion by closing fluid stop valve A. The first length of the fourth hydraulic path is identical to the first length of the third hydraulic path, but, by closing fluid stop valve A, pressurized fluid from the disc-end of the hydraulic cylinder 110 is forced to pass through the restrictive orifice 120. The restrictive orifice 120 only allows slow flowing pressurized fluid to return to the source of the pressurized fluid bypassing the first one-way check valve 105. In a fourth hydraulic state, the rod 112 and disc 115 of the hydraulic cylinders 110 float to a fully closed position (the fully closed position denoted by dotted lines in the hydraulic cylinder).

Figure 6:
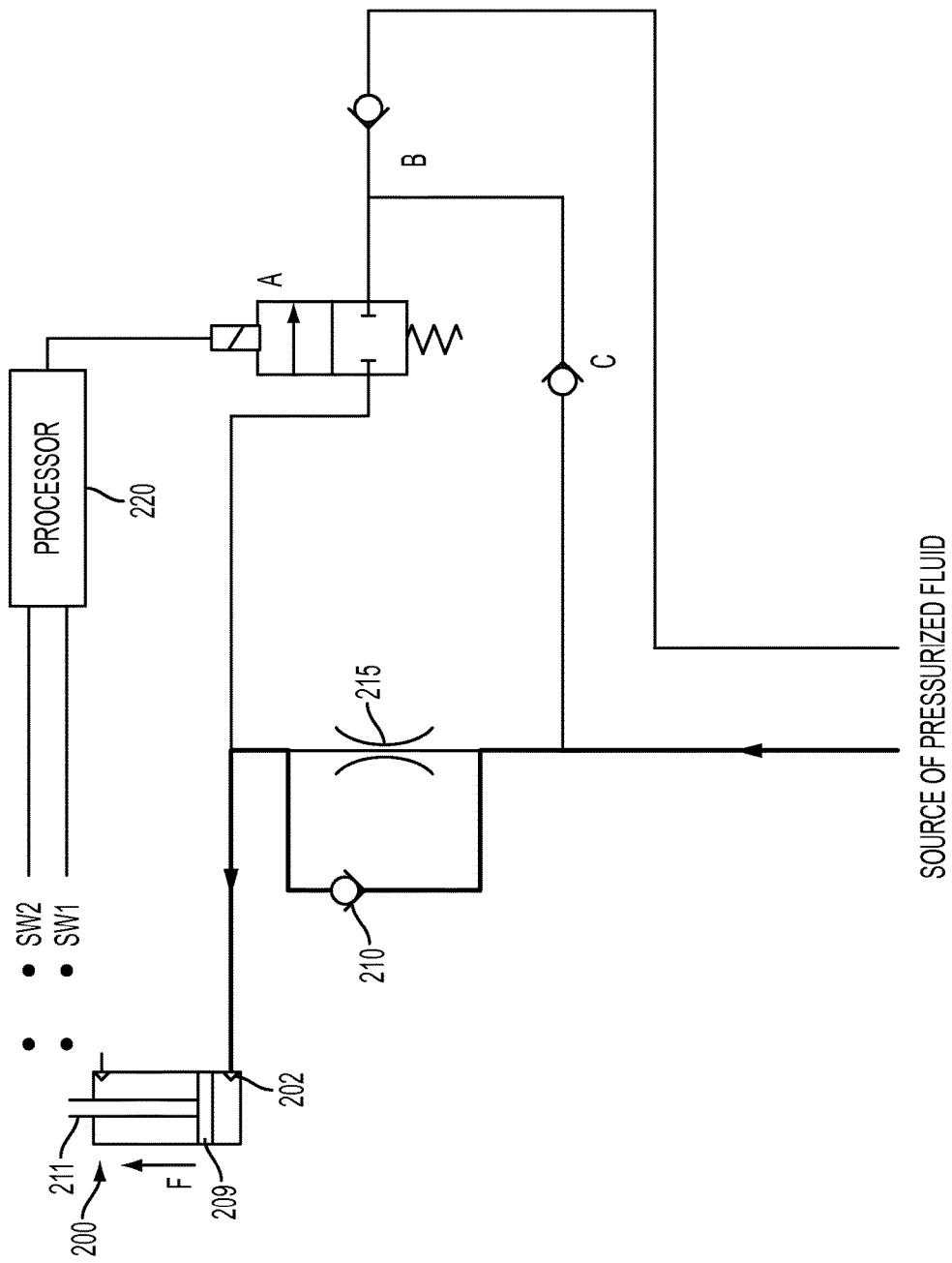
FIG. 6 depicts an alternative embodiment in which a circuit utilizes a single-acting cylinder rather than a double-acting cylinder in a first hydraulic state.

FIG. 6 through FIG. 9 depicts an alternative embodiment comprising a single-acting cylinder. FIG. 6 depicts a first hydraulic state during which a panel, such as a tailgate affixed to a baling mechanism on a baler, opens at a steady and quick rate of speed. The direction of the rod 211 and disc 209 move in the direction of the arrow labeled F. In the first hydraulic state, pressurized fluid from the source of pressurized fluid (in this embodiment, a tractor) flows (depicted by the bolded arrowhead) through the open valve 210 and then into a fluid opening 202 of the single-acting cylinder 200. The fluid stop valve A remains in a closed position and in a de-energized state. Pressurized fluid bypasses a restrictive orifice 215 positioned between the source of pressurized fluid and the single-acting cylinder 200 and passes through a one-way check valve 210. When the rod 211 and disc 209 of the cylinder 200 nearly reach its full extended height by pressurized fluid (the full height depicted in FIG. 7 by a dotted line near the disc 209), a switch SW2 is opened thereby energizing stop valve A and transitions the circuit to its second hydraulic state. The switch SW2 may be opened by one or a combination of (i) a diameter or density of a bale growing in the bale chamber; (ii) a presence or absence of a bale in the bale chamber; (iii) a predetermined position of the tailgate relative to its closed position; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber. A processor 220 may be preprogrammed by the operator to open the fluid stop valve in any one or combination of the above-identified conditions are met.

Figure 7:
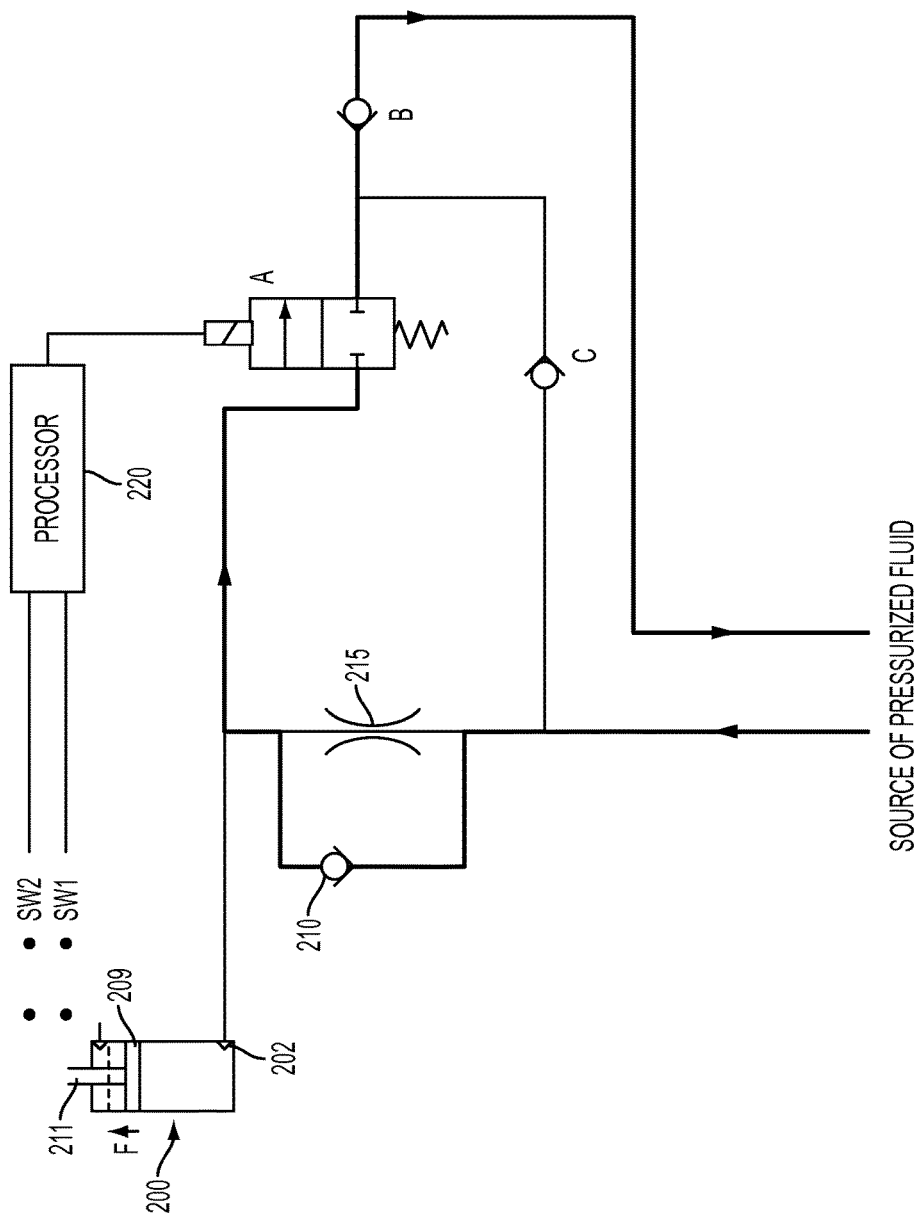
FIG. 7 depicts an alternative embodiment in which a circuit utilizes a single-acting cylinder in a second hydraulic state.

FIG. 7 depicts the second hydraulic state comprising a first and second hydraulic path. Pressurized fluid from the source of pressurized fluid bypasses the restrictive orifice 215 and flows through the open stop valve A in the first fluid path. Pressurized fluid in the first fluid path also bypasses the fluid opening 202 of the single-acting cylinder 200. In the second fluid path of the second fluid state, pressurized fluid flows from the stop valve A and returns to the source of the pressurized fluid. Without flow of pressurized fluid through the fluid opening 202 momentum and back pressure in the circuit at the first fluid opening 202 results in a floating of the disc 209 and rod 211 in the single-acting cylinder 200. The direction of the pressurized fluid is reversed when the operator closes the tailgate of the baling mechanism.

Figure 8:
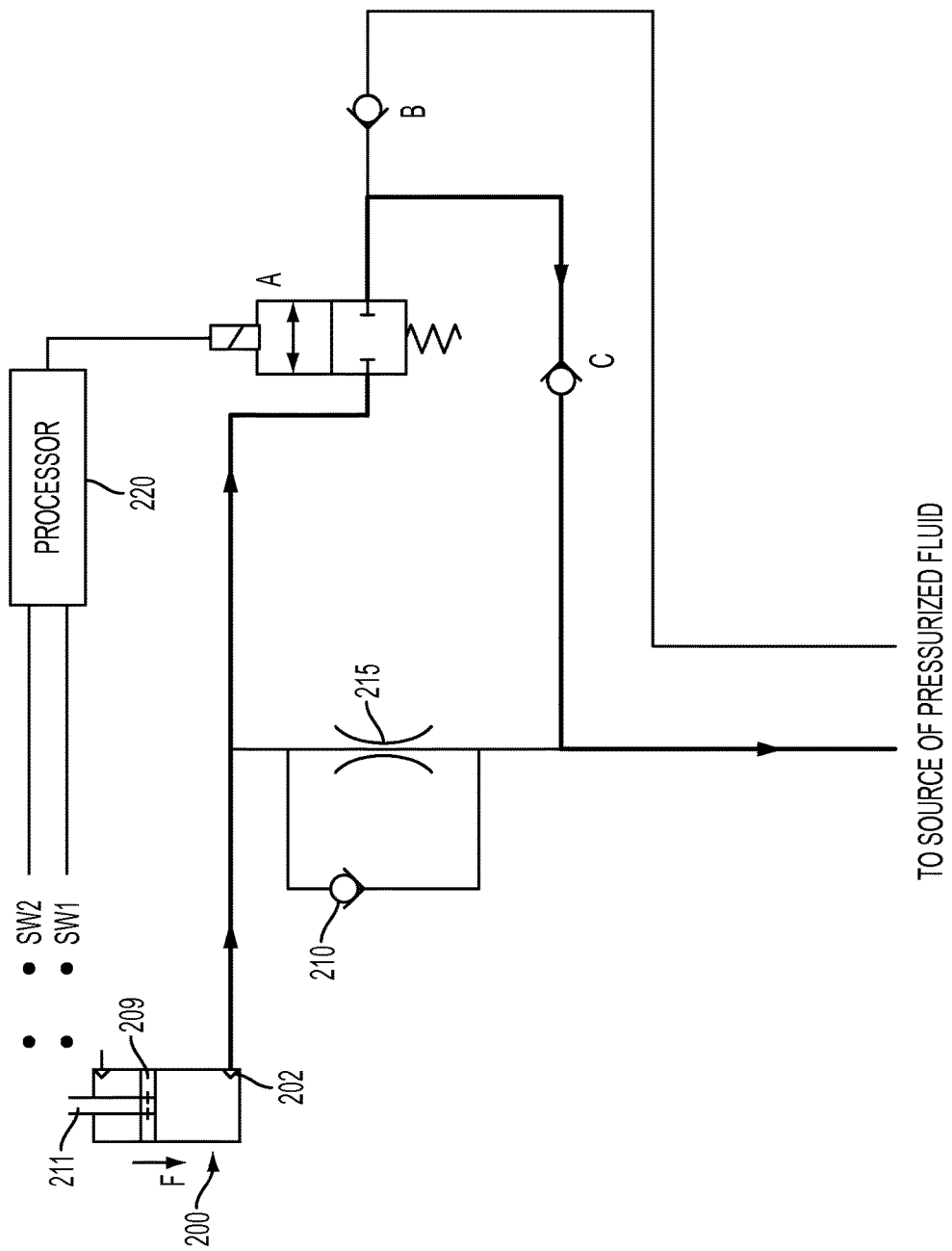
FIG. 8 depicts an alternative embodiment in which a circuit utilizes a single-acting cylinder in a third hydraulic state.

FIG. 8 depicts a third hydraulic state in which a panel, such as the tailgate of the baling mechanism, closes at a quick and steady pace by the operator reversing flow of the pressurized fluid in the hydraulic circuit form the second hydraulic state. Gravity pulls the rod 211 and disc 209 down of the single-acting cylinder down expelling pressurized fluid from the single-acting cylinder 200 and into circuit. With the stop valve A open, the pressurized fluid bypasses the restrictive orifice 215, allowing a steady contraction of the single-acting hydraulic cylinder 200. Once the rod 211 and disc 209 reach a position within the cylinder 200 at or near a fully contracted position, SW2 becomes de-energized and SW1 becomes energized thereby closing the stop valve A and transitioning to the fourth hydraulic state depicted in FIG. 9.

Figure 9:
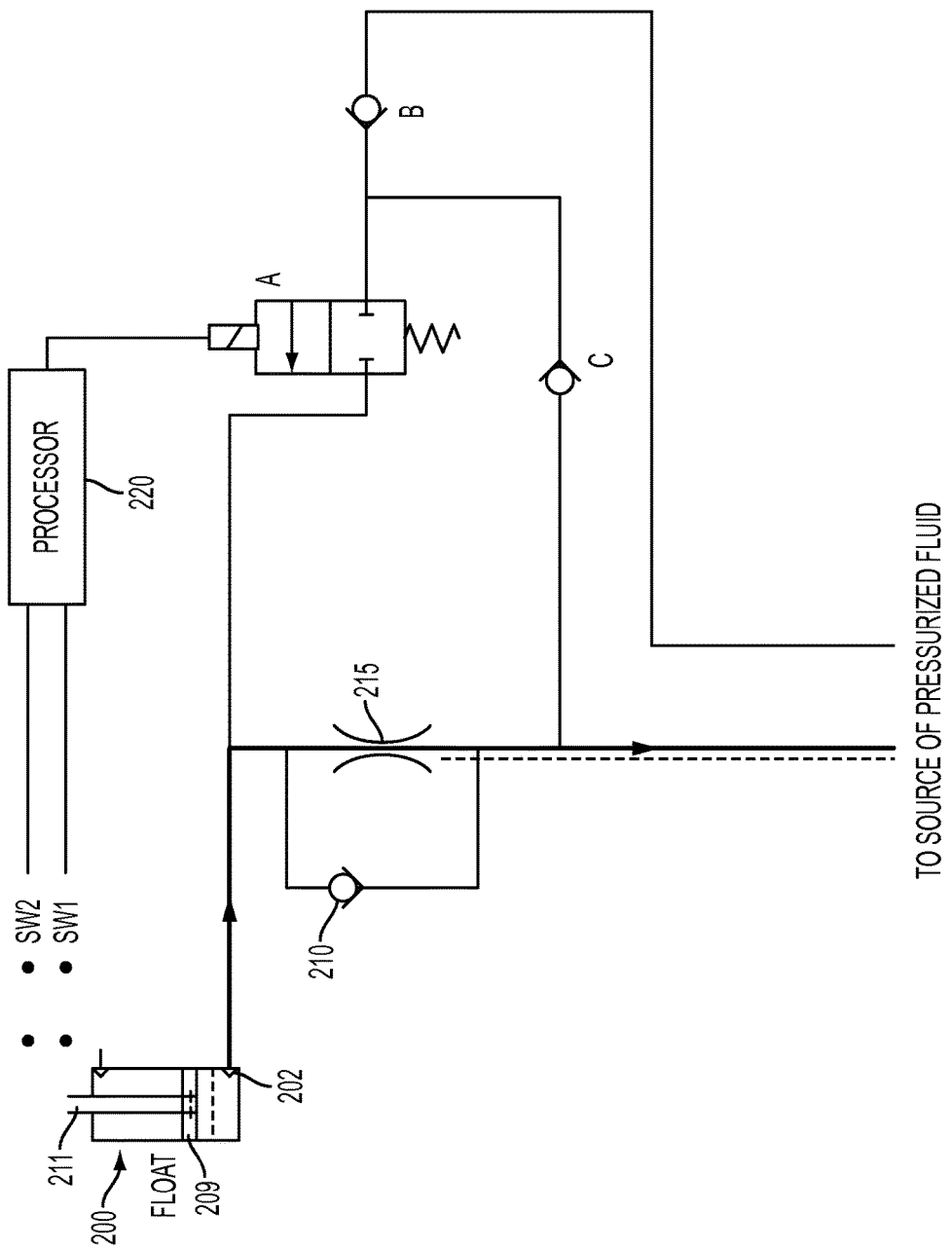
FIG. 9 depicts an alternative embodiment in which a circuit utilizes a single-acting cylinder in a fourth hydraulic state.

At or near the end of the tailgate close, stop valve A is closed. In the embodiment depicted in FIG. 9, switch SW1 is triggered by the contracting singe-acting hydraulic cylinder 200. The flow from the hydraulic cylinder 200 through the fluid opening 205 and into the hydraulic system with the stop valve closed comprises a hydraulic path comprising the flow of pressurized fluid through the restrictive orifice 215. Flow of the fluid through the restrictive orifice 215 creates a slow, deceleration of the rate at which the cylinder contracts thereby slowing and floating a tailgate of the baling mechanism in operable connection with the single-acting cylinder 200. Dotted lines beside the hydraulic path in FIG. 9 represent the slow rate of flow of the pressurized fluid in the circuit after it passes through the restrictive orifice 215.

One of ordinary skill in the art would appreciate that embodiments also include agricultural harvesters, systems, and baling mechanisms that include circuits comprising only the first hydraulic path, only the second hydraulic path, only the third hydraulic path, only the fourth hydraulic path, or any combinations thereof. One of ordinary skill in the art would appreciate that embodiments also include agricultural harvesters, systems, and/or baling mechanisms that include fluid circuits that comprise only the first hydraulic state, only the second hydraulic state, only the third hydraulic state, only the fourth hydraulic state, or any combinations thereof.

For instance, in some embodiments, the agricultural harvester or system disclosed herein comprises only the third and fourth hydraulic states, each state comprising a first and second hydraulic path of pressurized fluid disclosed herein. In some embodiments, the agricultural harvester or system disclosed herein comprises only the first and second hydraulic states, each state comprising a first and second hydraulic path of pressurized fluid disclosed herein. In either case, the invention also relates to methods of opening or closing a tailgate of a baling mechanism whereby the step of opening the tailgate comprises a first and second and/or a third and fourth hydraulic states, each hydraulic state comprising a first and second hydraulic path. In some embodiments, the invention relates to a method of opening a tailgate of a baler or baling mechanism, the method comprising operating the tailgate in a first hydraulic state comprising the first and second hydraulic paths disclosed herein, and operating the tailgate in a second hydraulic state comprising its first and second hydraulic paths disclosed herein. In some embodiments, the invention relates to a method of closing a tailgate of a baler or baling mechanism, the method comprising operating the tailgate in a hydraulic state identical or equivalent to the third hydraulic state disclosed herein and subsequently operating the tailgate in a hydraulic state identical or equivalent to the fourth hydraulic state disclosed herein. In some embodiments, the method of opening and/or closing a tailgate comprising activating a fluid circuit comprising one or more stop valves, and one or more restrictive orifices in parallel with one or more check valves such that when pressurized fluid bypasses the restrictive orifice, the tailgate raises or lowers at a relatively constant rate and when pressurized fluid flows through the restrictive orifice in a second hydraulic state, back pressure at a hydraulic cylinder in the circuit causes the opening and/or closing of the tailgate to steadily decrease and, optionally, stop or drift slowly upward or downward. In some embodiments, the hydraulic circuit does not comprise positional sensors or a check valve that forcibly decelerates the movement of the tailgate upon transition from one hydraulic state to another hydraulic state.

It should be understood that dashed lines in the Figures represents slow flow of pressurized fluid in the hydraulic circuit. Any stop valve comprising adjacently positioned but oppositely facing concave lines depicted in the figures represent a fluid stop vale with an restrictive orifice or adjustable stop valve with a restrictive orifice.

Embodiments described in FLUID CIRCUIT FOR BALE EJECTION WITH RESTRICTED FLOW, filed on Nov. 25, 2013 as U.S. patent application Ser. No. 14/089,512, which has issued as U.S. Pat. No. 9,113,599, invented by Kevin Smith and Luke Harris are part of this disclosure, and the application is incorporated by reference in its entirety.

Although the invention has been described with reference to exemplary embodiments, it is not limited thereto. Those skilled in the art will appreciate that numerous changes and modifications may be made to the disclosed embodiments of the invention and that such changes and modifications may be made without departing from the true spirit of the invention. It is therefore intended that the appended claims cover be construed to all such equivalent variations as fall within the true spirit and scope of the invention.

What is claimed is:

1. A system for operation of an ejection mechanism on an agricultural harvester comprising:
    an outlet and a panel, the panel movable between a closed and one or more open positions and obstructing the outlet in its closed position;
    at least one actuator mechanically linked to the panel, the at least one actuator capable of moving the panel between the closed and one or more open positions and having:
        at least a first fluid opening on one end of the actuator, wherein the first fluid opening feeds pressurized fluid into a hydraulic circuit; the hydraulic circuit comprising:
            a source of pressurized fluid in fluid communication with at least the first fluid opening for supplying fluid to and returning fluid from the at least one actuator in the hydraulic circuit;
            a fluid stop valve in fluid communication with the source of pressurized fluid and the at least one actuator; and
            a fluid controller that controls a flow of pressurized fluid through the fluid stop valve from the source of pressurized fluid or from the at least one actuator;
        a first hydraulic state in which pressurized fluid from the source of the pressurized fluid flows to the at least first fluid opening of the at least one actuator without contacting the fluid stop valve; and
        a second hydraulic state, whereupon the fluid stop valve is open, pressurized fluid from the source of the pressurized fluid flows through the open stop valve and returns to the source of the pressurized fluid thereby diverting a volume of pressurized fluid from entering the first fluid opening of the at least one actuator and reducing and/or stopping movement of the at least one actuator.

2. The system of claim 1, wherein the at least one actuator comprises a second fluid opening on the opposite end of the actuator relative to the first fluid opening, wherein the first and second fluid openings feed and return pressurized fluid into a hydraulic circuit;
    the hydraulic circuit comprising:
        a source of pressurized fluid in fluid communication with the first and second openings for supplying fluid to and returning fluid from the at least one actuator in the hydraulic circuit;
        a fluid stop valve in fluid communication with the source of pressurized fluid and the at least one actuator; and
        a fluid controller that controls a flow of pressurized fluid through the fluid stop valve from the source of pressurized fluid or from the at least one actuator;
    a first hydraulic state in which pressurized fluid from the source of the pressurized fluid flows to the first fluid opening of the at least one actuator without contacting the fluid stop valve, and, simultaneously, pressurized fluid from the at least one actuator returns to the source of the pressurized fluid through the second fluid opening; and
    a second hydraulic state, whereupon the fluid stop valve is open, pressurized fluid from the source of the pressurized fluid flows through the open stop valve and returns to the source of the pressurized fluid thereby diverting a volume of pressurized fluid from entering the first fluid opening of the at least one actuator and reducing and/or stopping movement of the actuator.

3. The system of claim 2, wherein the hydraulic circuit further comprises:
    a third hydraulic state in which pressurized fluid from the source of pressurized fluid flows to the second fluid opening of the at least one actuator, and, simultaneously, pressurized fluid returns from the at least one actuator through the first fluid opening and through the open stop valve allowing free flow of pressurized fluid from the at least one actuator to the source of the pressurized fluid; and a fourth hydraulic state, whereupon the fluid stop valve is closed, pressurized fluid flows from the at least one actuator through the first fluid opening and through a restrictive orifice and subsequently into the source of pressurized fluid, wherein the restrictive orifice allows minimal flow of volume in the hydraulic circuit thereby slowing and/or stopping the movement of the panel as it moves from an open position to its closed position.

4. A system for operation of an ejection mechanism on an agricultural harvester comprising:

an outlet and a panel, the panel movable between a closed and one or more open positions and obstructing the outlet in its closed position;

at least one actuator mechanically linked to the panel, the at least one actuator capable of moving the panel between the closed and one or more open positions and having at least a first fluid opening on one end of the actuator, wherein the at least one fluid opening feeds and returns pressurized fluid into a hydraulic circuit; the hydraulic circuit comprising:

a source of pressurized fluid in fluid communication with the first fluid opening for supplying fluid to and returning fluid from the at least one actuator in the hydraulic circuit;

a fluid stop valve in fluid communication with the source of pressurized fluid and the at least one actuator; and a fluid controller that controls a flow and/or direction of pressurized fluid through the fluid stop valve from the source of pressurized fluid or from the at least one actuator;

wherein the panel moves from one or more open positions to a closed position in a first and a second hydraulic state; whereby, in the first hydraulic state, the fluid stop valve is open, allowing pressurized fluid from at least one actuator through at least the first fluid opening to flow to the source of pressurized fluid; whereby, in the second hydraulic state, the pressurized fluid returns from the at least one actuator through the at least first fluid opening and through a restrictive opening;

wherein the restrictive opening allows minimal flow of volume in the hydraulic circuit thereby slowing and/or stopping the movement of the panel as it moves to the closed position.

5. The system of claim 4 further comprising a first switch and a second switch, the first switch and the second switch each having a first state and a second state and being in operable connection to the fluid controller, wherein the panel moves from the first hydraulic state to the second hydraulic state upon activation of the second switch from its first to second state.

6. The system of claim 4, wherein the at least one actuator comprises a second fluid opening on the end of the at least one actuator opposite the first fluid opening, wherein the first and second fluid openings feed and return pressurized fluid into a hydraulic circuit; the hydraulic circuit comprising:

a source of pressurized fluid in fluid communication with the first and second openings for supplying fluid to and returning fluid from the at least one actuator in the hydraulic circuit;

a fluid stop valve in fluid communication with the source of pressurized fluid and the at least one actuator; and a fluid controller that controls a flow and/or direction of pressurized fluid through the fluid stop valve from the source of pressurized fluid or from the at least one actuator; and wherein the panel moves from one or more open positions to a closed position in a first and a second hydraulic state; whereby, in the first hydraulic state, the fluid stop valve is open allowing pressurized fluid from the source of pressurized fluid to enter the second fluid opening; and, simultaneously, pressurized fluid returns from the at least one actuator through the first fluid opening to the source of the pressurized fluid through the opened fluid stop valve; whereby, in the second hydraulic state, the fluid stop valve is closed allowing pressurized fluid from the source of pressurized fluid to enter the second fluid opening; and, simultaneously, pressurized fluid returns from the at least one actuator through the first fluid opening and through a restrictive opening;

wherein the restrictive opening allows minimal flow of volume in the hydraulic circuit thereby slowing and/or stopping the movement of the panel as it moves to the closed position.

7. The system of claim 5, further comprising a controller that measures a time period for the first switch change from a first state to a second state and a time period for the second switch to change from a first state to a second state, wherein the time period for the second switch to change from its first state to its second state is dependent upon at least one or a combination of: (i) a diameter or density of a bale growing in the bale chamber; (ii) a presence or absence of a bale in the bale chamber; (iii) a predetermined position of the panel relative to its closed position or one or more open positions; (iv) a predetermined position of a serpentine arm mechanically linked to the agricultural harvester and capable of upward movement upon initiating ejection of the bale from the bale chamber; and (v) a predetermined position of a bale ramp mechanically linked to the agricultural harvester and capable of supporting a bale ejected from the bale chamber.

8. The system of claim 7, wherein the controller that measures a time period for the first switch change from a first state to a second state and a time period for the second switch to change from a first state to a second state is a potentiometer.

9. A method for operating an ejection mechanism on an agricultural harvester, the method comprising:

providing a system comprising:

an outlet and a panel, the panel movable between a closed and one or more open positions and obstructing the outlet in its closed position;

an actuator mechanically linked to the panel, the actuator capable of moving the panel between the closed and one or more open positions and the actuator having:

a fluid opening on one end of the actuator, wherein the fluid opening feeds pressurized fluid into a hydraulic circuit; the hydraulic circuit comprising:

a source of pressurized fluid in fluid communication with the fluid opening for supplying fluid to and returning fluid from the actuator in the hydraulic circuit;

a fluid stop valve in fluid communication with the source of pressurized fluid and the actuator; and a fluid controller that controls a flow of pressurized fluid through the fluid stop valve from the source of pressurized fluid or from the actuator;

a first hydraulic state in which pressurized fluid from the source of the pressurized fluid flows to the fluid opening of the actuator without contacting the fluid stop valve; and a second hydraulic state, whereupon the fluid stop valve is open, pressurized fluid from the source of the pressurized fluid flows through the open stop valve and returns to the source of the pressurized fluid thereby diverting a volume of pressurized fluid from entering the fluid opening of the actuator and reducing and/or stopping movement of the actuator, wherein the method further comprising:

directing a flow of pressurized fluid into a first hydraulic path and then subsequently into a second hydraulic path if to extend the actuator; and/or directing a flow of pressurized fluid into a third hydraulic path and then subsequently into a fourth hydraulic path if to contract the actuator.

\* \* \* \* \*